(12) United States Patent
Agarwal et al.

(10) Patent No.: US 9,076,068 B2
(45) Date of Patent: Jul. 7, 2015

(54) METHOD AND APPARATUS FOR EVALUATING COLOR IN AN IMAGE

(71) Applicant: Datacolor Holding AG, Lucerne (CH)

(72) Inventors: Niraj Agarwal, Windham, NH (US); Hong Wei, Lawrenceville, NJ (US)

(73) Assignee: Datacolor Holding AG, Lucerne (CH)

(*) Notice: Subject to any disclaimer, the term of this patent is extended or adjusted under 35 U.S.C. 154(b) by 93 days.

(21) Appl. No.: 13/962,495

(22) Filed: Aug. 8, 2013

(65) Prior Publication Data

US 2013/0322750 A1   Dec. 5, 2013

Related U.S. Application Data

(63) Continuation-in-part of application No. 12/897,583, filed on Oct. 4, 2010, now Pat. No. 8,532,371.

(51) Int. Cl.
*G06K 9/46* (2006.01)
*H04N 1/60* (2006.01)
*G01J 3/46* (2006.01)
*G01J 3/50* (2006.01)
*G01J 3/52* (2006.01)

(52) U.S. Cl.
CPC ............ *G06K 9/4652* (2013.01); *H04N 1/6033* (2013.01); *G01J 3/462* (2013.01); *G01J 3/463* (2013.01); *G01J 3/50* (2013.01); *G01J 3/524* (2013.01)

(58) Field of Classification Search
None
See application file for complete search history.

(56) References Cited

U.S. PATENT DOCUMENTS

| | | | | |
|---|---|---|---|---|
| 4,812,904 A | * | 3/1989 | Maring et al. | 348/135 |
| 4,967,379 A | | 10/1990 | Ott | |
| 4,975,862 A | | 12/1990 | Keller et al. | |
| 5,049,986 A | * | 9/1991 | Aono et al. | 358/522 |
| 5,159,185 A | | 10/1992 | Lehr | |
| 5,206,707 A | | 4/1993 | Ott | |
| 5,319,215 A | | 6/1994 | Stibaner et al. | |
| 5,526,285 A | * | 6/1996 | Campo et al. | 356/405 |
| 5,751,450 A | * | 5/1998 | Robinson | 358/504 |
| 5,850,472 A | | 12/1998 | Alston et al. | |
| 6,024,018 A | * | 2/2000 | Darel et al. | 101/365 |
| 6,095,650 A | * | 8/2000 | Gao et al. | 351/227 |
| 6,118,455 A | * | 9/2000 | Hidaka et al. | 345/589 |
| 6,232,954 B1 | * | 5/2001 | Rozzi | 345/601 |
| 6,240,204 B1 | * | 5/2001 | Hidaka et al. | 382/167 |
| 6,272,248 B1 | * | 8/2001 | Saitoh et al. | 382/218 |
| 6,594,384 B1 | * | 7/2003 | Kim et al. | 382/162 |
| 6,628,807 B1 | | 9/2003 | Mumelter et al. | |
| 6,850,272 B1 | | 2/2005 | Terashita | |

(Continued)

OTHER PUBLICATIONS

PCT Search Report and Written Opinion for PCT/US11/54620; Feb. 28, 2012.

(Continued)

*Primary Examiner* — Bhavesh Mehta
*Assistant Examiner* — Feng Niu
(74) *Attorney, Agent, or Firm* — Diana J. Rea; Wall & Tong LLP

(57) ABSTRACT

A method for evaluating a color of a sample includes acquiring a color calibrated swatch of the sample, the color calibrated swatch comprising a plurality of pixels, and comparing all pixels that are of a first color in a swatch of a standard to all of the plurality of pixels that are of a second color, wherein the second color is a color in the swatch of the sample that is most similar to the first color in the swatch of the standard.

5 Claims, 6 Drawing Sheets

(56) References Cited

U.S. PATENT DOCUMENTS

| | | | |
|---|---|---|---|
| 6,983,695 | B2 | 1/2006 | Mogi et al. |
| 7,020,331 | B2 * | 3/2006 | Saikawa et al. .............. 382/167 |
| 7,034,968 | B2 | 4/2006 | Bhaskar et al. |
| 7,230,707 | B2 | 6/2007 | Ingleson et al. |
| 7,313,270 | B2 * | 12/2007 | Sones ........................... 382/159 |
| 7,352,488 | B2 | 4/2008 | Ben-Chorin et al. |
| 7,522,769 | B2 * | 4/2009 | Harville et al. .............. 382/167 |
| 7,554,586 | B1 | 6/2009 | Imai et al. |
| 7,773,221 | B2 | 8/2010 | Xu et al. |
| 8,199,361 | B2 | 6/2012 | Dokuni |
| 8,320,674 | B2 * | 11/2012 | Guillou et al. ................ 382/179 |
| 8,532,371 | B2 * | 9/2013 | Agarwal et al. .............. 382/162 |
| 2002/0150290 | A1 | 10/2002 | Robins et al. |
| 2003/0076993 | A1 | 4/2003 | Li |
| 2003/0142222 | A1 | 7/2003 | Hordley |
| 2003/0204410 | A1 * | 10/2003 | Agarwal ........................... 705/1 |
| 2004/0179101 | A1 | 9/2004 | Bodnar et al. |
| 2004/0184639 | A1 * | 9/2004 | Jackson et al. ................ 382/111 |
| 2004/0197020 | A1 | 10/2004 | Sones |
| 2004/0218182 | A1 | 11/2004 | Alman et al. |
| 2004/0240728 | A1 | 12/2004 | Saikawa et al. |
| 2005/0012930 | A1 | 1/2005 | Steinfield et al. |
| 2005/0169523 | A1 * | 8/2005 | Hayaishi ....................... 382/167 |
| 2005/0259868 | A1 * | 11/2005 | Sones ........................... 382/159 |
| 2006/0034427 | A1 | 2/2006 | Brooks |
| 2006/0159336 | A1 | 7/2006 | Uezono |
| 2006/0192861 | A1 | 8/2006 | Ohga |
| 2007/0013812 | A1 | 1/2007 | Ajito et al. |
| 2007/0024657 | A1 | 2/2007 | Zhang et al. |
| 2007/0058858 | A1 * | 3/2007 | Harville et al. .............. 382/165 |
| 2007/0058860 | A1 | 3/2007 | Harville et al. |
| 2007/0201738 | A1 * | 8/2007 | Toda et al. .................... 382/144 |
| 2007/0230774 | A1 * | 10/2007 | Baqai ............................ 382/162 |
| 2007/0242877 | A1 | 10/2007 | Peters et al. |
| 2008/0030752 | A1 * | 2/2008 | Obrador .......................... 358/1.9 |
| 2008/0044082 | A1 | 2/2008 | Muller |
| 2008/0137154 | A1 * | 6/2008 | Nakaya et al. ................ 358/474 |
| 2008/0267443 | A1 * | 10/2008 | Aarabi ........................... 382/100 |
| 2009/0097745 | A1 * | 4/2009 | Kim et al. ..................... 382/167 |
| 2009/0139297 | A1 | 6/2009 | Lu et al. |
| 2009/0141975 | A1 | 6/2009 | Li |
| 2009/0225158 | A1 * | 9/2009 | Kimoto ............................ 348/77 |
| 2010/0104178 | A1 | 4/2010 | Tamburrino et al. |
| 2010/0148083 | A1 * | 6/2010 | Brown et al. ................. 250/372 |
| 2010/0228511 | A1 * | 9/2010 | Chin et al. ...................... 702/82 |
| 2011/0134332 | A1 * | 6/2011 | Jaynes et al. ................. 348/708 |
| 2012/0082374 | A1 | 4/2012 | Agarwal et al. |
| 2012/0219206 | A1 | 8/2012 | Janowczyk et al. |
| 2014/0028842 | A1 * | 1/2014 | Abramson et al. ............ 348/143 |

OTHER PUBLICATIONS

Nieves et al., "Recovering fluorescent spectra with an RGB digital camera and color filters using different matrix factorizations" Applied Optics vol. 46, No. 19, Jul. 1, 2007; Retrieved online Feb. 12, 2012 at: <http://www.ugr.es/~jnieves/Textos/JLNieves%20etal%20AO2007.pdf>.

Chiao et al., Color signals in natural scenes: characteristics of reflectance spectra and effects of natural illuminants J. Opt. Soc. Am. A/ vol. 17, No. 2/Feb. 2000, Retrieved online Feb. 12, 2012 at: <http://userpages.umbc.edu/~chiao/josa2000_1.pdf>.

International Search Report and Written Opinion of PCT/US2014/050194, dated Aug. 7, 2014, pp. 1-12.

* cited by examiner

METHOD AND APPARATUS FOR EVALUATING COLOR IN AN IMAGE

CROSS REFERENCE TO RELATED APPLICATIONS

This application is a continuation-in-part of co-pending U.S. patent application Ser. No. 12/897,583, filed Oct. 4, 2010, which is herein incorporated by reference in its entirety.

FIELD OF THE INVENTION

The present invention generally relates to the field of imaging, and more specifically relates to color measurement.

BACKGROUND

Color measurement systems help to improve operational efficiency and product quality in supply chains. For example, color approval offices for the global apparel supply chain, apparel mills and dye houses, paint stores, textile printing shops, carpet manufacturers, manufacturers of wood panels, tiles, vinyl sheets, and laminates, and other industries relying on the digital color workflow require accurate color evaluation and visualization.

Conventionally, spectrophotometers are used to measure product color for solid color areas. These measurements are compared to reference standards to verify product color consistency. In some cases, the measurement and comparison data is transmitted to the buyer for remote color approval. However, some samples (e.g., printed or textured samples) cannot present a large enough area of uniform color to the spectrophotometer viewing port to allow for proper measurement.

SUMMARY OF THE INVENTION

A method for evaluating a color of a sample includes acquiring a color calibrated swatch of the sample, the color calibrated swatch comprising a plurality of pixels, and comparing all pixels that are of a first color in a swatch of a standard to all of the plurality of pixels that are of a second color, wherein the second color is a color in the swatch of the sample that is most similar to the first color in the swatch of the standard.

Another method for performing a color comparison between a first swatch comprising a first plurality of pixels and a second swatch comprising a second plurality of pixels includes computing a first set of weighted mean RGB values for the first swatch, computing a second set of weighted mean RGB values for the second swatch, and calculating a color difference between the first swatch and the second swatch, based on the first set of weighted mean RGB values and the second set of weighted mean RGB values.

BRIEF DESCRIPTION OF THE DRAWINGS

The teachings of the present invention can be readily understood by considering the following detailed description in conjunction with the accompanying drawings, in which.

DETAILED DESCRIPTION

In one embodiment, the present invention is a method and apparatus for evaluating color in an image. Embodiments of the invention perform imaging under multiple light sources that emulate International Commission on Illumination (CIE) reference illuminants in order to capture the color of a sample that cannot be measured using a spectrophotometer. Images taken in this way can be used to facilitate color difference evaluation for monochromatic, textured, and multi-colored samples. For example, a captured image of a batch sample may be compared to an image of a standard sample to verify a match. Parts of the image of a batch sample selected by the user may also be compared to selected parts of a standard sample. The images and associated data can also be shared over a network and integrated in a color approval workflow.

Figure 1:
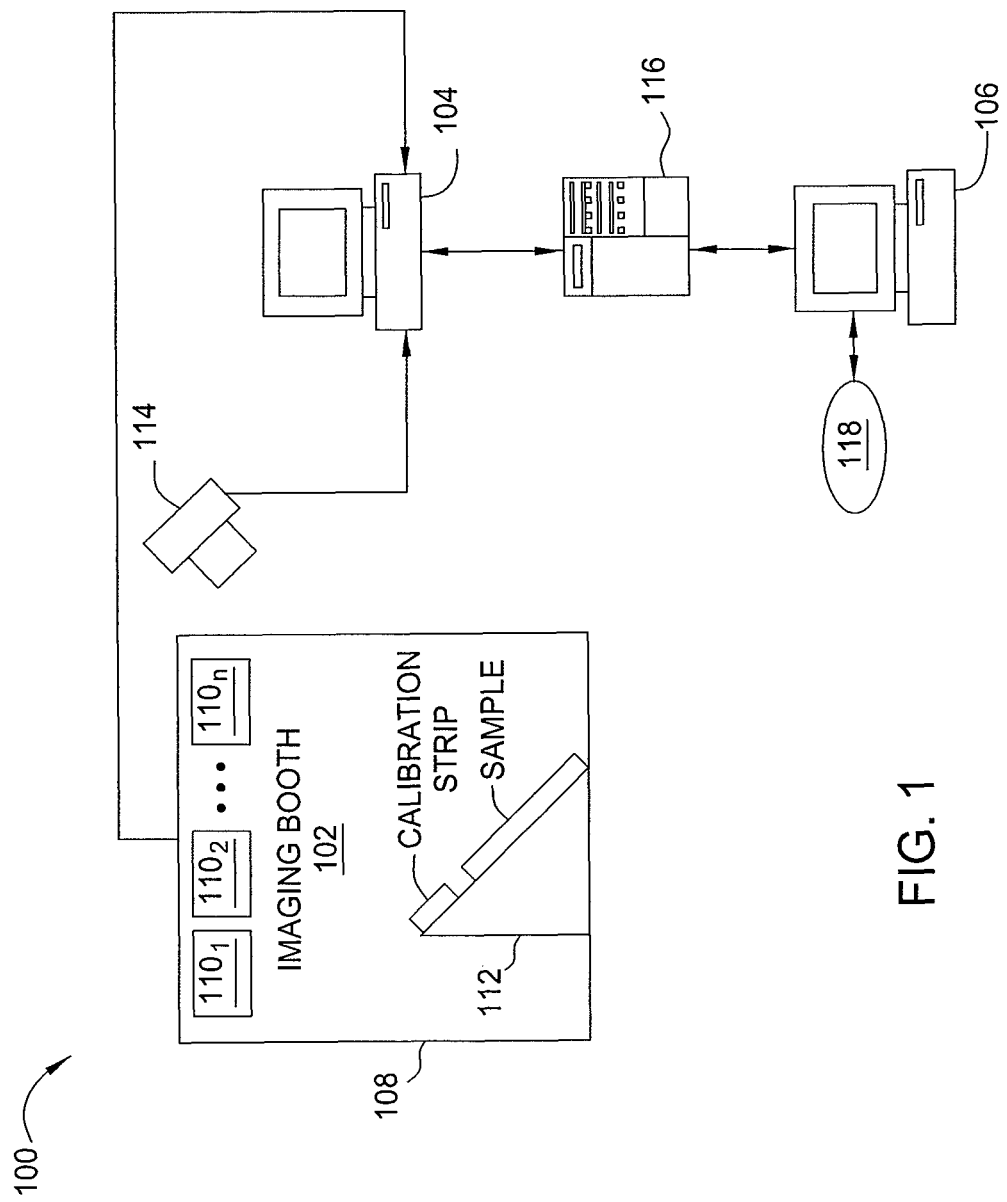
FIG. 1 is a schematic diagram illustrating one embodiment of a system for capturing color-accurate images, according to the present invention.

FIG. 1 is a schematic diagram illustrating one embodiment of a system 100 for capturing color-accurate images, according to the present invention. As illustrated, the main components of the system 100 include an imaging booth 102, a first computing device 104, and a second computing device 106.

The imaging booth 102 comprises a light box or housing 108 within which a plurality of light sources $110_1$-$110_n$ (hereinafter collectively referred to as "light sources 110") are contained. In addition, the imaging booth 102 houses a sample positioning mechanism such as a sample tray or pedestal 112 designed to support a sample to be measured (e.g., a fabric swatch) and a color calibration strip (e.g., a strip including a plurality of color swatches of known spectral reflectance) and/or a gray card. In one embodiment, reference color data for the colors displayed on the calibration strip is pre-measured (e.g., using a spectrophotometer). In one embodiment, the calibration strip is integrated with the pedestal 112.

The light sources 110 each provide an emulation of a different type of reference illuminant. These types of reference illuminants may include, for example, daylight (e.g., emulating CIE standard "D65"), tungsten light (e.g., emulating CIE standard "Illuminant A"), or fluorescent light (e.g., emulating CIE standard "F11"). The light sources 110 are positioned such that the illumination emitted by the light sources 110 is incident upon the pedestal 112, and more specifically upon the sample and calibration strip supported on the pedestal 112.

The imaging booth 102 additionally comprises a digital camera 114 that is positioned outside the housing 108. Specifically, the digital camera 114 is positioned in front of the housing 108, which allows the digital camera 114 to view and capture images of the sample housed within the housing 108. In one embodiment, the digital camera 114 is held in position by a bracket (not shown) affixed to the exterior of the housing 108, from which the digital camera 114 is removable. In alternative embodiments, the imaging booth 102 may be configured as an imaging unit. For example, the imaging booth 102 and all of its components may be scaled to fit within a handheld device that has an open port for positioning the sample. In such a case, the light sources 110 and digital camera 114 may also be part of the handheld device.

The first computing device 104 is communicatively coupled to the imaging booth 102 and to the digital camera 114. The first computing device 104 is configured to acquire and process images captured by the digital camera 114. In particular, the first computing device 104 converts the camera RGB values of the captured images to tristimulus XYZ values, as discussed in further detail below. In one embodiment, the first computing device 104 stores processed images and associated data (and possibly meta data relating to the sample) on a server 116. The server may also store data relating to a standard sample. In one embodiment, the first computing device 104 comprises a general purpose computing device or a special purpose computing device, such as a personal computer, a laptop computer, a tablet computer, a smart phone, or the like.

The second computing device 106 is a remote computer that is communicatively coupled to the server 116. The second computing device 106 is configured to retrieve and display the processed images for viewing and color evaluation (and thus comprises a display and/or printer). Color evaluation using the second computing device 106 may comprise visual evaluation and/or numerical evaluation that simulates visual evaluation, as discussed below. In one embodiment, the second computing device 106 comprises a general purpose computing device or a special purpose computing device, such as a personal computer, a laptop computer, a tablet computer, a smart phone, or the like.

In one embodiment, the second computing device 106 is coupled to a screen color calibration device 118 such as a screen colorimeter. The screen color calibration device 118 calibrates the colors displayed by the second computing device 106 so that visual color evaluation performed using the second computing device 106 is reliable. Although not illustrated, another screen color calibration device may be coupled to the first computing device 106.

In an alternative embodiment, a single computing device replaces the first computing device 104 and the second computing device 106. Thus, both processing and display of the images occur on a single computing device. In addition, color evaluation and image color difference computation may also occur on this single computing device. Thus, in this alternative embodiment, the server 116 may not be necessary.

In yet another embodiment, three different computing devices are used. In this case, a first computing device processes the images as described above and a second computing device displays the images as described above. A third computing device then performs computations that judge the similarity of the colors.

Figure 2:
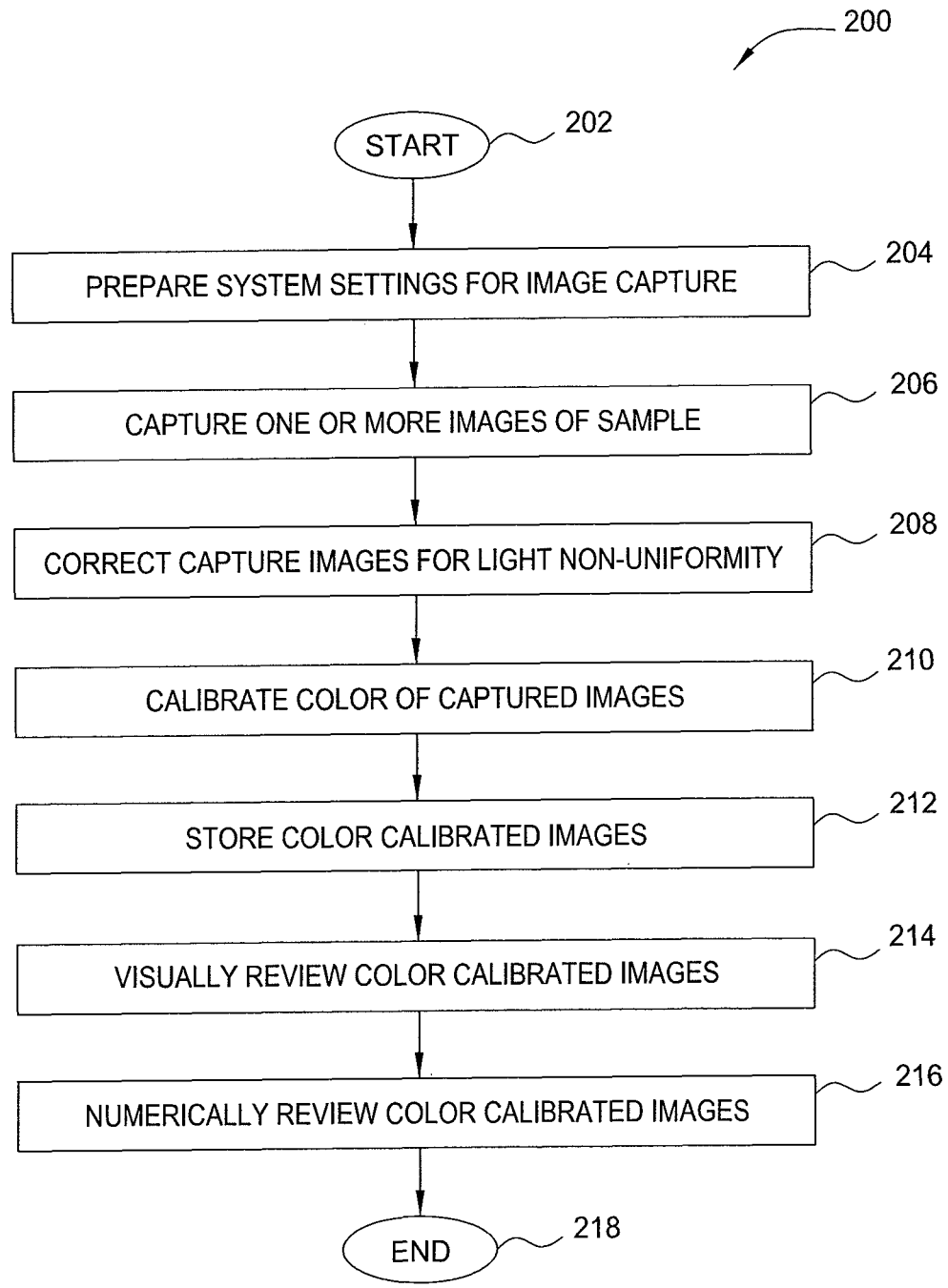
FIG. 2 is a flow diagram illustrating one embodiment of a method for evaluating a color sample, according to one embodiment of the present invention.

FIG. 2 is a flow diagram illustrating one embodiment of a method 200 for evaluating a color sample, according to one embodiment of the present invention. The method 200 may be implemented, for example, in conjunction with the system 100 illustrated in FIG. 1. The method 200 is not limited to implementation with the configuration illustrated in FIG. 1, however, and may be implemented in conjunction with systems whose configurations differ from the system 100.

The method 200 is implemented in step 202 and proceeds to step 204, where the settings of the system 100 are prepared for image capture. In particular, the sample to be evaluated and the calibration strip are positioned on the pedestal 112 of the imaging booth 102. One or more of the light sources 110 also is selected to illuminate the sample. In one embodiment, a sequence by which each selected light source 110 illuminates the sample one-by-one is specified. In addition, the digital camera 114 is positioned such that the sample and the calibration strip are within its field of view, and the gray card is used to calibrate the digital camera 114 for light intensity non-uniformity in the imaging plane.

In step 206, the digital camera 114 captures one or more images of the sample and the calibration strip. Any given one of the captured images will display both the sample and the calibration strip. As discussed above, multiple images under different reference illuminants may be captured. Imaging under multiple reference illuminants allows color capture from samples that cannot be measured using a spectrophotometer (as a spectrophotometer has too big an aperture to measure from small elements of a multicolored sample).

In step 208, the first computing device 104 corrects the captured images for light non-uniformity, in accordance with the gray card. Then, in step 210, the first computing device calibrates the color of the captured images, in accordance with the calibration strip, to produce color calibrated output images. In one embodiment, the first computing device 104 operates on the captured images in the RAW image file format.

In step 212, the color calibrated output images and/or meta data related to the sample is stored. In one embodiment, the output images and data are stored locally on the first computing device 104. In another embodiment, the output images and data are delivered by the first computing device 104 over a network to the server 116 for remote storage.

In step 214, the color calibrated output images are visually reviewed for approval. In one embodiment, review of the color calibrated output images involves retrieving the output images over the network and displaying the output images by the second computing device 106. Alternatively, in the non-distributed embodiment, the output images may be displayed on the first computing device 104. In one embodiment, images of multiple samples may be viewed at once on the display. In particular, visual review is based on the display RGB values of the color calibrated output images (where the display RGB values are calculated from the XYZ tristimulus values). Visual review is facilitated by calibrating the screen color of the display using an International Color Consortium (ICC) profile created by the screen color calibration device 118.

In step 216, the color calibrated output images are numerically reviewed. In particular, the second computing device 106 (or first computing device 104) executes a program that calculates the difference in color appearance between a pair of swatches represented in an image (e.g., of a standard sample and of a batch sample). In another embodiment, the swatches (e.g., the standard sample and the batch sample) can be separate images. Within the context of the present invention, a "swatch" refers to a set of pixels from a part of an image that contains either a batch sample or a standard sample. Specifically, for each image, all pixels of a given color in one of the swatches (e.g., of the batch sample) are compared to all pixels of the most similar color in the other swatch (e.g., of the standard sample). This comparison is done after the process of converting the camera RGB values of the captured images to XYZ tristimulus values. One technique for performing this comparison is discussed in further detail in below. Thus, display and review on the second computing device 106 allows for review and approval of samples based on remotely captured images.

The method 200 terminates in step 218.

The method 200 allows remote parties to verify color consistency between a standard sample and a set of batch samples, based on intra- or inter-image comparison (depending on whether the standard and the batch samples are represented in the same or different images). The image comparison visually and numerically compares the colors of the standard sample and the batch samples. In this way, color consistency can be assured without the need to ship physical samples, and the production history for the color products can be archived for future reference.

As discussed above in connection with step 208, the first computing device 104 corrects the captured images for light non-uniformity, using a gray card. This process is well-known and involves scaling each pixel intensity to the mean pixel intensity in every image plane (R, G, B for each camera illuminant), image-by-image.

For example, let P be any one of the camera R, G, B image channels for any of the plurality of camera illuminants. In addition, let $P(i, j)$ be the ij pixel of the P image in the presence of test colors, and $P_0(i, j)$ be the ij pixel of the P image in the presence of the gray card. Then, for each of the nine P channels, the following steps are performed.

First, the image $P_0(i,j)$ and its mean $P_{mean}$ is acquired for all i,j. Next, a correction array $C(i, j)=P_{mean}/P_0(i, j)$ is constructed. Then, the test color image $P(i, j)$ is acquired. The corrected P image $P_{corr}(i,j)=P(i,j)*C(i,j)$ is then constructed.

As discussed above, the present invention allows images of samples to be color calibrated based on multiple images of the samples captured under different reference illumination conditions. In one embodiment, this calibration involves estimating the XYZ tristimulus values of a sample's reflectance under three illuminants, from the RGB camera values and from the RGB camera values of a simultaneously-imaged chart of calibration samples. These calibration samples together comprise a calibration chart. These operations are performed, for example, in accordance with step 216 of the method 200. In one embodiment, the tristimulus values of the reflectance under the three reference illuminants (column 9-vector r) are estimated from the reflectance's measured camera RGB values under the same three illuminants (column 9-vector d) in conjunction with a number K of simultaneously acquired calibration samples whose pre-measured reflectance spectra are used to compute tristimulus values that are stored in a database.

The calibration values in this case comprise a 9×K matrix D of camera values from the calibration chart and a 9×K matrix $R_T$ of tristimulus values from the same calibration chart, where K is the number of reflectances. For example, a color chart having K=24 reflectances may be used. The matrix D from the calibration chart is measured by the camera under the same illuminants, and at the same times, as is an image of test reflectances, and the matrix $R_T$ is pre-computed from the reflectance values pre-measured from the calibration chart, in conjunction with color matching functions and three reference-illuminant spectra.

To calibrate, a 9×9 matrix M and an offset vector b are computed so as to estimate the tristimulus 9-vector r of any test reflectance. The matrix M and offset vector b map (as closely as possible) all of the database camera value 9-vectors to corresponding tristimulus 9-vectors as follows:

$$R_T = MD + b \quad \text{(EQN. 1)}$$

EQN. 1 may be represented as a homogeneous equation as:

$$R_T = M_A D_A \quad \text{(EQN. 2)}$$

where $M_A=[M\ b]$ is the 9×10 matrix comprising M right-augmented by the column vector b, and $D_A=[D'\ 1']'$ is the 10×9 matrix comprising D augmented from the bottom by a row K-vector 1 of 1's. Here, D' is the transpose of D. To estimate $M_A$, the following least-square approximation is used:

$$M_A = R_T \text{Pinv}(D_A) = R_T D_A' (D_A D_A')^{-1} \quad \text{(EQN. 3)}$$

In an alternative embodiment, a 3×K matrix stores the data for each illuminant handled separately. The 3×3 calibration matrix M is calculated separately for each illuminant, and each image is corrected using the corresponding M matrix.

Once calibration is performed as set forth above, a new tristimulus 9-vector $r_a$ is computed for each pixel from its measured camera 10-vector $d_A$ (the column vector d extended by 1 in the tenth component), as:

$$r_a = M_A D_A \quad \text{(EQN. 4)}$$

After retrieving the required sets of tristimulus values, one can convert the XYZ values to display RGB values using conventional color management techniques based on International Color Consortium (ICC) profiles. For example, the techniques described by Morovic in "Color Gamut Mapping" (Colour Engineering: Achieving Device Independent Colour, Chapter 13, pp. 297-317, Wiley 2002) may be used. These steps result in a complete transformation between camera values under three illuminants and displayed tristimulus values under another three illuminants.

In one embodiment of the above, the number of calibration database reflectances is K=24. This represents the number of color samples used for calibration. In practice, one may have more than twenty-four samples. In one embodiment, the reflectance values fall in a range from zero to one.

r is a column 9-vector, where r(1) is the R value of reflectance under camera illuminant 1; r(2) is the G value of reflectance under camera illuminant 1; . . . ; and r(9) is the B value of reflectance under camera illuminant 3.

$d_A$ is a column 10-vector, where $d_A(1)$ is the X value of reflectance under display illuminant 1; $d_A(2)$ is the Y value of reflectance under display illuminant 1; . . . ; $d_A(9)$ the Z value of reflectance under display illuminant 3; and $d_A(10)=1$.

$R_T$ is a 9×24 matrix, where $R_T(1,1)$ is the R value of reflectance 1 under camera illuminant 1; $R_T(1,2)$ is the R value of reflectance 2 under camera illuminant 1; $R_T(2,1)$ is the G value of reflectance 1 under camera illuminant 1; and $R_T(2,2)$ is the G value of reflectance 2 under camera illuminant 1.

$D_A$ is a 9×24 matrix, where $D_A(1,1)$ is the X value of reflectance 1 under display illuminant 1; $D_A(1,2)$ is the X value of reflectance 2 under display illuminant 1; $D_A(2,1)$ is the Y value of reflectance 1 under display illuminant 1; $D_A(2,2)$ is the Y value of reflectance 2 under display illuminant 1; . . . ; $D_A(9,24)$ is the Z value of reflectance 3 under display illuminant 3; $D_A(10,1)=1$; . . . ; and $D_A(10,24)=1$.

Thus, multiple digital spectra of light sources are used, in conjunction with the acquired camera RGB values, to compute the calibrated XYZ tristimulus values for a sample under the corresponding light source. Then, if one wishes to display the same colors that are seen in the imaging booth 102, the spectra of the real illuminants (i.e., the illuminants under which the images of the sample are captured) are adjusted to match the digital spectra used to compute the XYZ tristimulus values.

Given a swatch depicting a standard sample and a swatch depicting a batch sample (where each swatch comprises a plurality of colored pixels), the methods described below predict the visual color match between the swatch depicting the standard sample and the swatch depicting the batch sample. The approach in this case is as follows.

First, the regions to be compared (i.e., the standard swatch and the batch swatch) are excerpted from the color-calibrated batch sample image and from the color-calibrated standard sample image (which, as described above, may be the same image). All of the images at this point are display-RGB images (converted from XYZ images) and have the same destination illuminant. Optionally, the images are quantized into a smaller number of colors (e.g., 256 colors). Quantization may be performed using, for example, the methods described by Wu in "Efficient Statistical Computations for Optimal Color Quantization" (Graphics Gems, vol. II, p. 126-133). In one embodiment, the standard and batch swatches are quantized separately, but it is also possible to quantize the standard and the batch swatches to a common palette. Prior to this analysis, the camera RGB values for the whole image or images from which the swatches were derived were converted to tristimulus XYZ values under each light using the (10×9) M matrix, described above. In an alternative embodiment, the quantization can be performed using display RGB values. However, in this case, if subsequent processing steps use the tristimulus XYZ values, then the display RGB values (which were derived from the tristimulus XYZ values) must be transformed back into tristimulus XYZ values. Techniques for performing the display RGB-to-tristimulus XYZ transformation are known to those of skill in the art and are not discussed in detail here.

For each pixel color in the standard swatch, the color difference relative to every color in the batch swatch is computed. In one embodiment, the color difference for a color pair is computed as ΔE, which describes the distance between two colors in color space. ΔE for the closest color in the batch swatch is weighted by the pixel frequency of the color in the batch swatch. The mean standard RGB values are also weighted by the pixel frequency of the color in the standard swatch. The weighted sum over all colors in the standard swatch provides a color difference measure that correlates with a visual comparison between the standard swatch and the batch swatch. The same batch swatch color may be mapped to multiple standard swatch colors.

Limiting the comparison to the closest colors automatically disregards colors in the batch swatch that are not present in the standard swatch and vice versa (and are therefore considered not relevant to the visual comparison). Alternative embodiments of the image difference calculation include techniques based on image color histogram differences. The disclosed method essentially "looks for the standard in the batch" and is not impacted by differences in relative amounts of each color between the standard swatch and the batch swatch. This is a desirable characteristic when the goal is to evaluate color consistency between a pair of samples. The present invention especially useful when, for example, comparing a flat fabric standard swatch having a relatively narrow distribution of pixel colors of a uniform color with a fabric batch that is highly textured and therefore has a much wider distribution of pixel colors. The present invention is also useful when, for example, comparing pairs having printed or patterned regions of distinctly different colors.

Additionally, the percent of standard sample colors (weighted by total pixel count for the standard sample color) that can be matched to any color in the batch samples (e.g., within a tolerance of ΔE) is identified. The percent of the batch colors that are matched to the standard colors is also identified. These numbers are correlated, but are also individual outputs.

Thus, the present invention evaluates the color difference between a first swatch (e.g., depicting a standard sample) and a second swatch (e.g., depicting batch sample) by comparing all of the pixels of one color in the first swatch with all of the pixels of the most similar color in the second swatch. In particular, two color matching indices are calculated to represent the color different between the first swatch and the second swatch.

In one particular embodiment, two images are generated for each light source: one XYZ image (e.g., sixteen bits, floating, with an .exr file extension) and one display RGB image (e.g., eight bits, integer, with a .png file extension). For instance, if the system includes three light sources, three image sets, each comprising two images (i.e., six total images), will be produced. The color difference calculations discussed below refer to calculations performed for a single light source (unless otherwise specified) and image set; the same calculations are repeated for the remaining light sources and respective image sets.

Within the context of the present invention, an overall match index is referred to as "Mean ΔE" or "ΔE of Mean," which is the color difference (i.e., $\Delta E_{CMC}$) between the arithmetic mean of the colors of the first swatch and the arithmetic mean of the colors of the second swatch. The XYZ images are used in this calculation.

The CIE tristimulus vector of the first swatch, $$\begin{pmatrix} \overline{X}_1 \\ \overline{Y}_1 \\ \overline{Z}_1 \end{pmatrix},$$

is obtained by averaging the corresponding CIE tristimulus values of all of the pixels in the corresponding XYZ image (e.g., extracted from an .exr file) as shown below:

$$\begin{pmatrix} \overline{X}_1 \\ \overline{Y}_1 \\ \overline{Z}_1 \end{pmatrix} = \sum_{i=1,j=1}^{M,N} \frac{\begin{pmatrix} X_1 \\ Y_1 \\ Z_1 \end{pmatrix}_{i,j}}{MN} \qquad (EQN. 5)$$

where (i, j) is the coordinate of a pixel, (M, N) is the dimension of the first swatch, and the subscript "1" refers to the first swatch.

Similarly, the CIE tristimulus vector of the second swatch, $$\begin{pmatrix} \overline{X}_2 \\ \overline{Y}_2 \\ \overline{Z}_2 \end{pmatrix},$$

is obtained by averaging the corresponding CIE tristimulus values of all of the pixels in the corresponding XYZ image (e.g., extracted from an .exr file) as shown below:

$$\begin{pmatrix} \overline{X}_2 \\ \overline{Y}_2 \\ \overline{Z}_2 \end{pmatrix} = \sum_{i=1,j=1}^{P,Q} \frac{\begin{pmatrix} X_2 \\ Y_2 \\ Z_2 \end{pmatrix}_{i,j}}{PQ} \qquad (EQN. 6)$$

where (i, j) is the coordinate of a pixel, (P, Q) is the dimension of the second swatch, and the subscript "2" refers to the second swatch.

Once the CIE tristimulus vectors of the first and second swatches are obtained, the vectors can be used to calculate the overall match index ΔE (for example $\Delta E_{CMC}$).

Within the context of the present invention, a visual match index is referred to as "Visual ΔE" or "Best Match ΔE." As discussed above, the calculation of the visual match index essentially "looks for the standard in the batch." Rather than averaging all of the pixels in first and second swatches as the overall match index does, the visual match index calculation compares local colors in the first and second swatches in a manner that resembles the visual assessment performed by the human eye.

Due to the difficulties of processing floating point XYZ images (e.g., .exr files), the visual match index calculation is in one embodiment based on the display RGB images (e.g., .png files). Basing the visual match index on the display RGB images is intended to simplify processing (which technically is possible—but more difficult—when based on the XYZ images).

Figure 3:
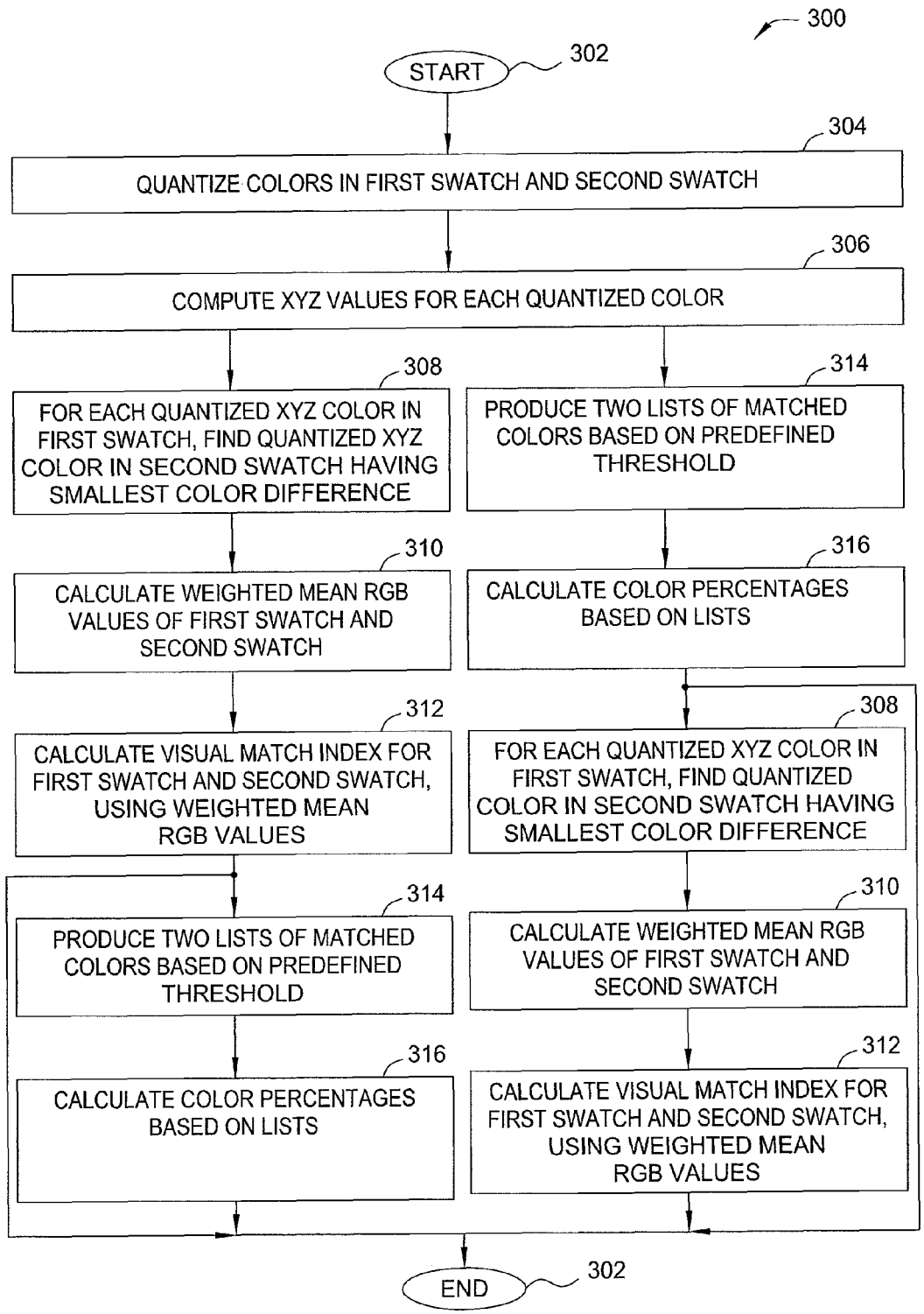
FIG. 3 is a flow diagram illustrating one embodiment of a method for evaluating a color difference between a first image and a second image, according to the present invention.

FIG. 3 is a flow diagram illustrating one embodiment of a method 300 for evaluating a color difference between a first swatch (e.g., depicting a standard sample) and a second swatch (e.g., depicting a batch sample), according to the present invention. In particular, the method 300 describes how to calculate the visual match index described above.

The method 300 begins in step 302. In step 304, the colors of the first and second swatches (e.g., the display RGB images, extracted from .png files) are both quantized to reduce the number of distinct colors. For exemplary purposes, the swatches are assumed to be quantized to 256 colors for the following explanation. The direct outputs of the quantization process comprise a color palette and a two-dimensional image. The color palette comprises a 256×3 array in which each row represents a color and each column represents an R, G, or B value for each color. The two-dimensional image is indexed such that each pixel in the two-dimensional image contains only a corresponding color index (i.e., row number) in the array. Counting the pixels in the two-dimensional image yields a 256×1 array containing a histogram of the total number of pixels for each indexed color.

Figure 4:
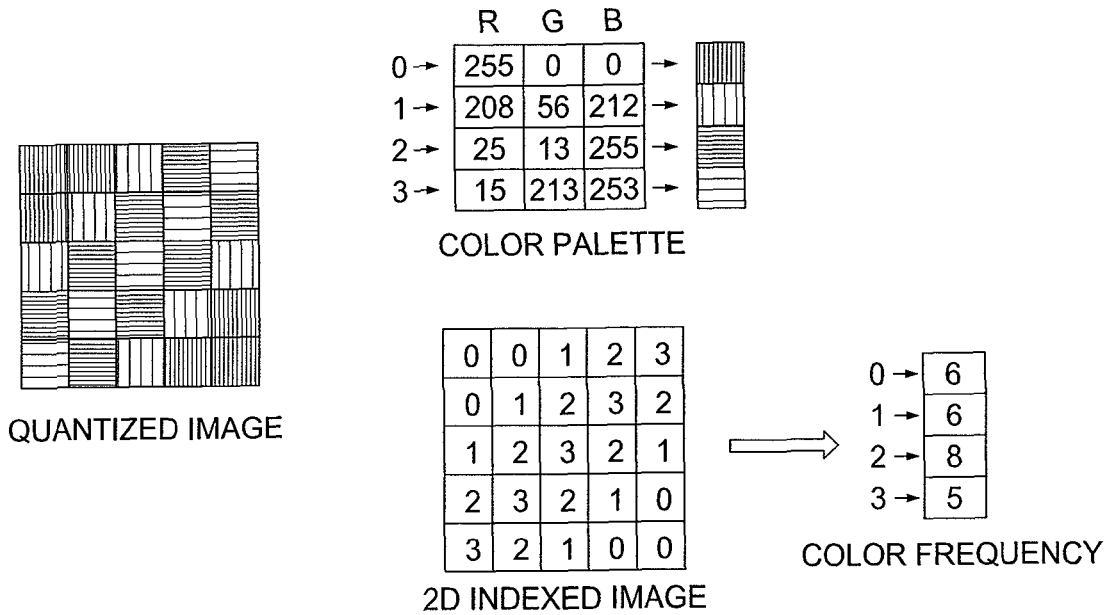
FIG. 4 is a diagram illustrating an exemplary 5×5 quantized image and corresponding color palette.

FIG. 4 is a diagram illustrating an exemplary 5×5 quantized image and corresponding color palette. Each square in the image represents a single pixel with a coded color. As illustrated, there are four indexed colors among the twenty five pixels of the quantized image. The color palette comprises a 4×3 array in which the R, G, and B values of the four indexed colors are contained. In addition, a corresponding two-dimensional indexed image indicates the color index (e.g., zero through three) contained in each pixel. From the indexed image, the frequency of each indexed color can be calculated and used to produced a 4×1 array as shown.

Thus, step 304 produces four arrays: (1) a color palette of the first swatch (e.g., a 256×3 array); (2) a color palette of the second swatch (e.g., a 256×3 array); (3) a color frequency array of the indexed colors in the first swatch (e.g., a 256×1 array); and (4) a color frequency array of the indexed colors in the second swatch (e.g., a 256×1 array).

In step 306, the XYZ values of each indexed color in the first and second swatches are computed. In one embodiment, this involves converting the quantized display RGB values in each row of the color palettes of the first and second swatches into XYZ values. First, these display RGB values are linearized with respect to energy. When the display RGB values are calculated in the standard RGB (sRGB) color space, RGB linearization may be accomplished as follows:

$$v = \begin{cases} (V)/12.92 & V \leq 0.04045 \\ ((V+0.05)/1.055)^{2.4} & V > 0.04045 \end{cases} \quad \text{(EQN. 7)}$$

where v represents the linearized r, g, or b values $v \in \{r, g, b\}$ and V represents the original R, G, or B values $V \in \{R, G, B\}$.

Next, the linearized display RGB values, rgb, are mapped to XYZ values with D65 white point by:

$$\begin{pmatrix} X \\ Y \\ Z \end{pmatrix} = M_1 \begin{pmatrix} r \\ g \\ b \end{pmatrix}, \quad \text{(EQN. 8)}$$

$$\text{where } M_1 = \begin{pmatrix} 0.4124564 & 0.3575761 & 0.1804375 \\ 0.2126729 & 0.7151522 & 0.0721750 \\ 0.0193339 & 0.1191920 & 0.9503041 \end{pmatrix}$$

since the display RGB values (rgb) are in sRGB space. In one embodiment, the XYZ values are further chromatically adapted to the XYZ values depending on the light source white point. For example, the chromatic adaptation may be a linear Bradford transformation, achieved by color management techniques that are known in the art.

Thus, step 306 produces four arrays: (1) the XYZ values of all of the colors in the quantized first swatch (e.g., a 256×3 array); (2) the XYZ values of all of the colors in the quantized second swatch (e.g., a 256×3 array); (3) the total number of pixels in the first swatch (e.g., an integer); and (4) the total number of pixels in the second swatch (e.g., an integer).

One embodiment of the method 300 next proceeds to step 308. In step 308, for each color in the first swatch, the closest corresponding color (i.e., the color having the smallest color difference) is found in the second swatch. More specifically, for each quantized color $[X,Y,Z]_{k,1}$ in the first swatch (where $[X,Y,Z]_{k,1}$ is the quantized color in the $k^{th}$ row of the array of the XYZ values of all of the colors in the quantized first swatch), the one quantized color $[X,Y,Z]_{m,2}$ in the second swatch (which is, for example, in the $M^{th}$ row of the array of the XYZ values of all of the colors in the quantized second swatch) that has the smallest color difference (for example, $\Delta E_{CMC}$) is found. Each pair of quantized colors [k, m] is recorded. It is possible that one quantized color in the second swatch may be matched to multiple quantized colors in the first swatch.

Figure 5:
FIG. 5 is a diagram illustrating one embodiment of an array produced by a step of the method illustrated in FIG. 3.

Thus, step 308 produces one array (e.g., a 256×2 array). FIG. 5 is a diagram illustrating one embodiment of an array produced by step 308 of the method 300. The first column of the array represents the index of the colors in the first swatch, and the second column of the array represents the index of the color in the second swatch that has the smallest color difference relative to the corresponding color from the first swatch (i.e., the color whose index is listed in the same row of the array).

In step 310, the weighted mean RGB values of the first and second display RGB images corresponding to the first and second swatches are calculated. In one embodiment, the mean RGB of the first swatch is calculated by averaging the colors at the first column of the array produced in step 308, after each row of the color palette is weighted by the total count of the corresponding color recorded in the corresponding row of the color frequency array of the indexed colors in the first swatch. Mathematically, this may be expressed as:

$$RGB_1 = [\overline{R}_1\ \overline{G}_1\ \overline{B}_1] = \frac{\sum\limits_{\text{only } i \text{ listed in first column of array}} \text{Color}_1(i, 1:3) \times \text{Frequency}_1(i)}{\sum\limits_{\text{only } i \text{ listed in first column of array}} \text{Frequency}_1(i)} \quad \text{(EQN. 9)}$$

where $\text{Color}_1$ is the color palette of the first swatch, $\text{Frequency}_1$ is the color frequency array of the indexed colors in the first swatch, and $\text{Pixels}_1$ is the total number of pixels in the first swatch. EQN. 9 assumes that the first swatch has been quantized to 256 colors; however, alternative quantization schemes are easily accommodated by substitution. EQN. 9 also ignores those colors that have very small frequencies. In one embodiment, the cutoff threshold for the frequency is defined based on the specific application and may range from 0.1% to 0.2%.

The mean RGB of the second swatch is calculated similarly. Mathematically, this may be expressed as:

$$RGB_2 = [\overline{R}_2\ \overline{G}_2\ \overline{B}_2] = \frac{\sum\limits_{\text{only } i \text{ listed in second column of array}} \text{Color}_2(i, 1:3) \times \text{Frequency}_2(i)}{\sum\limits_{\text{only } i \text{ listed in second column of array}} \text{Frequency}_2(i)} \quad \text{(EQN. 10)}$$

where $\text{Color}_2$ is the color palette of the second swatch, $\text{Frequency}_2$ is the color frequency array of the indexed colors in the second swatch, and $\text{Pixels}_2$ is the total number of pixels in the second swatch.

Thus, step 310 produces two outputs: (1) a vector (e.g., 1×3) containing the weighted mean RGB values of the first swatch; and (2) a vector (e.g., 1×3) containing the weighted mean RGB values of the second swatch.

In step 312, the visual match index (Visual ΔE) is calculated for the first and second swatches. In one embodiment, this involves first converting the weighted mean RGB values calculated in step 310 into XYZ values with corresponding chromatic adaptation. This may be accomplished in the same manner described above in connection with step 306.

The newly calculated XYZ values are then used to calculate ΔE (for example, $\Delta E_{CMC}$ (1:2)) following the procedure described above. The calculation disregards the spatial distribution of the colors in the first and second swatches.

Thus, step 312 produces one output: a visual match index that may be output (e.g., displayed or sent) to a user.

In step 314, two lists of matched colors are produced, based on a predefined color difference threshold ($\Delta E_{tolerance}$). The first list includes all of the colors in the batch swatch that are close to each color in the standard swatch. The second list includes all of the colors in the standard swatch that are close to each color in the batch swatch. The "closeness" of the colors is gated by the color difference threshold $\Delta E_{tolerance}$.

Specifically, for each color $[X,Y,Z]_{i,1}$ (.e., each color in the array of XYZ values of all of the colors in the quantized first swatch), all colors in the array of XYZ values of all of the colors in the quantized second swatch that have a color difference less than a predefined threshold ($\Delta E_{tolerance}$) of $[X,Y,Z]_{i,1}$ are identified. The indices of these colors are recorded in a first list.

Similarly, for each color $[X,Y,Z]_{i,2}$ (.e., each color in the array of XYZ values of all of the colors in the quantized second swatch), all colors in the array of XYZ values of all of the colors in the quantized first swatch that have a color difference less than a predefined threshold ($\Delta E_{tolerance}$) of $[X,Y,Z]_{i,2}$ are identified. The indices of these colors are recorded in a second list.

The predefined threshold ($\Delta E_{tolerance}$) is either hardcoded or user-definable. In an exemplary embodiment, the predefined threshold is 2.0.

Thus, step 314 produces two lists: (1) a list of colors in the second swatch that match each color in the first swatch; and (2) a list of colors in the first swatch that match each color in the second swatch.

In step 316, the color percentages are calculated. In one embodiment, step 316 calculates the percentage of the pixels in the second swatch whose colors are present in the first swatch, and vice versa.

For instance, the number of pixels in the first swatch that have the colors listed in the list of colors in the first swatch that match each color in the second swatch may be summed. This sum is then divided by the total number of pixels in the first swatch. This can be expressed mathematically as follows:

$$\text{Match}_1 = 100 \times \Sigma_{i\ in\ list} \text{Frequency}_1(i)/\text{Pixels}_1 \quad \text{(EQN. 11)}$$

where "i in list" is the colors listed in the list of colors in the first swatch that match each color in the second swatch (e.g., as produced in step 314).

Similarly, the number of pixels in the second swatch that have the colors listed in the list of colors in the second swatch that match each color in the first swatch may be summed. This sum is then divided by the total number of pixels in the second swatch. This can be expressed mathematically as follows:

$$\text{Match}_2 = 100 \times \Sigma_{i\ in\ list} \text{Frequency}_2(i)/\text{Pixels}_2 \quad \text{(EQN. 12)}$$

where "i in list" is the colors listed in the list of colors in the second swatch that match each color in the first swatch (e.g., as produced in step 314).

Thus, step 316 produces two values: (1) the percentage of the colors in the first swatch that are present in the second swatch; and (2) the percentage of the colors in the second swatch that are present in the first swatch. These percentages may be output (e.g., displayed or sent) to a user.

The method 300 ends in step 318.

As illustrated in FIG. 3, the steps of the method 300 may also be performed in several alternative orders. For instance, referring to the left-hand side of FIG. 3, the method 300 may terminate immediately after step 312 is performed (i.e., bypassing steps 314-316, discussed above). Alternatively, referring to the right-hand side of FIG. 3, step 306 may be followed directly by step 314. Once step 314 is performed, the method 300 may proceed to steps 316, 308, 310, and 312 before ending in step 318. As a further alternative, the method 300 may terminate immediately after step 316 is performed (i.e., bypassing steps 308-312). Thus, some of the steps of the method 300 may be performed in different orders, and some of the steps may also be considered optional. The same reference numerals have been used for the corresponding steps on the left- and right-hand sides of FIG. 3 in order to make clear that the same operations are being performed, simply in a different order.

It is noted that, due to the very different calculation approaches, the values of the overall match index (Mean ΔE) and the visual match index (Visual ΔE) are not correlated. For example, the visual match index is not necessarily smaller than the overall match index. The overall match index is a mathematical averaging view of the color difference, whereas the visual match index is more sensitive to local color variations.

Figure 6:
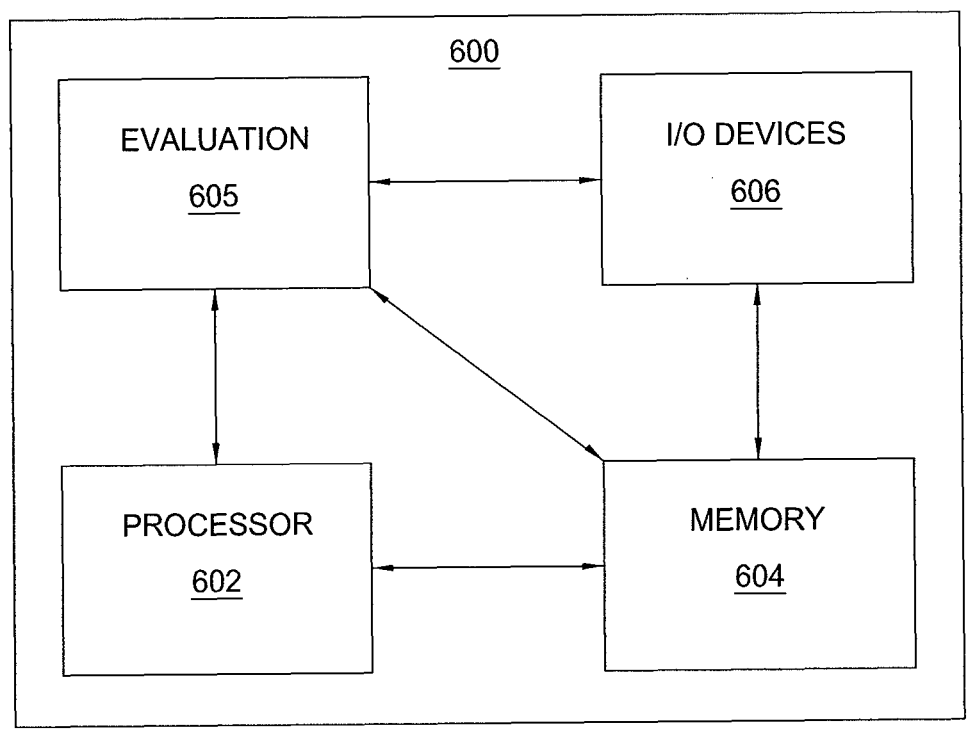
FIG. 6 is a high-level block diagram of the present invention that is implemented using a general purpose computing device.

FIG. 6 is a high-level block diagram of the present invention that is implemented using a general purpose computing device 600. In one embodiment, a general purpose computing device 600 comprises a processor 602, a memory 604, an evaluation module 605 and various input/output (I/O) devices 606 such as a display, a keyboard, a mouse, a stylus, a wireless network access card, a colorimeter, and the like. In one embodiment, at least one I/O device is a storage device (e.g., a disk drive, an optical disk drive, a floppy disk drive). It should be understood that the evaluation module 605 can be implemented as a physical device or subsystem that is coupled to a processor through a communication channel.

Alternatively, as discussed above, the evaluation module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the evaluation module 605 for evaluating the color of an image as described herein with reference to the preceding Figures, can be stored on a computer readable storage device (e.g., RAM, magnetic or optical drive or diskette, and the like).

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

While the foregoing is directed to embodiments of the present invention, other and further embodiments of the invention may be devised without departing from the basic scope thereof. Various embodiments presented herein, or portions thereof, may be combined to create further embodiments. Furthermore, terms such as top, side, bottom, front, back, and the like are relative or positional terms and are used with respect to the exemplary embodiments illustrated in the Figures, and as such these terms may be interchangeable.

What is claimed is:

1. A method for performing a color comparison between a first swatch comprising a first set of pixels and a second swatch comprising a second set of pixels, the method comprising:
computing a first set of weighted mean RGB values for the first swatch;
computing a second set of weighted mean RGB values for the second swatch; and
calculating a color difference between the first swatch and the second swatch, based on the first set of weighted mean RGB values and the second set of weighted mean RGB values, wherein the calculating disregards at least one of: (1) a color that is present in the second swatch, but outside a threshold distance from any color in the first swatch or (2) a spatial distribution of colors in the first swatch and a spatial distribution of colors in the second swatch.

2. A method for performing a color comparison between a first swatch comprising a first set of pixels and a second swatch comprising a second set of pixels, the method comprising:
computing a first set of weighted mean RGB values for the first swatch;
computing a second set of weighted mean RGB values for the second swatch;
calculating a color difference between the first swatch and the second swatch, based on the first set of weighted mean RGB values and the second set of weighted mean RGB values; and
generating a list, the list comprising a plurality of pairs of colors, each of the plurality of pairs of colors including a color from the first swatch and a color from the second swatch that is closest among all colors in the second swatch to the color from the first swatch.

3. The method of claim 2, further comprising:
calculating a percentage of colors present in the second swatch that are also present in the first swatch.

4. A method for performing a color comparison between a first swatch comprising a first set of pixels and a second swatch comprising a second set of pixels, the method comprising:
computing a first set of weighted mean RGB values for the first swatch;
computing a second set of weighted mean RGB values for the second swatch;
calculating a color difference between the first swatch and the second swatch, based on the first set of weighted mean RGB values and the second set of weighted mean RGB values; and
generating a list, the list comprising a plurality of pairs of colors, each of the plurality of pairs of colors including a color from the second swatch and a color from the first swatch that is closest among all colors in the first swatch to the color from the second swatch.

5. The method of claim 4 further comprising:
calculating a percentage of colors present in the first swatch that are also present in the second swatch.

* * * * *